US012603890B2

(12) United States Patent　　　　(10) Patent No.:　US 12,603,890 B2
Hyndman et al.　　　　　　　　　　(45) Date of Patent:　Apr. 14, 2026

| | | | |
|---|---|---|---|
| 11,770,398 | B1 | 9/2023 | Erlingsson et al. |
| 11,785,104 | B2 | 10/2023 | Erlingsson et al. |
| 12,445,495 | B2 | 10/2025 | Hyndman |
| 12,461,738 | B1 * | 11/2025 | Christensen ........ H04L 41/0806 |
| 2022/0200869 | A1 * | 6/2022 | Erlingsson .............. H04L 67/10 |
| 2022/0222354 | A1 | 7/2022 | Agarwwal |
| 2022/0272163 | A1 | 8/2022 | Schuller et al. |
| 2023/0036145 | A1 * | 2/2023 | Ramachandran ... H04L 63/0815 |
| 2023/0161614 | A1 | 5/2023 | Herzberg et al. |

(54) METHOD FOR SENSITIVE INFRASTRUCTURE PROTECTION

(71) Applicant: International Business Machines Corporation, Armonk, NY (US)

(72) Inventors: Arn Hyndman, Ottawa (CA); Nicholas Sauriol, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 18/539,881

(22) Filed: Dec. 14, 2023

(65) Prior Publication Data

US 2025/0202901 A1　　Jun. 19, 2025

(51) Int. Cl.
　　*G06F 21/00*　　(2013.01)
　　*G06F 8/77*　　(2018.01)
　　*H04L 9/40*　　(2022.01)

(52) U.S. Cl.
　　CPC .............. *H04L 63/102* (2013.01); *G06F 8/77* (2013.01); *H04L 63/108* (2013.01)

(58) Field of Classification Search
　　CPC ....... H04L 63/102; H04L 63/108; G06F 8/77; G06F 8/71
　　See application file for complete search history.

(56) References Cited

U.S. PATENT DOCUMENTS

| | | | |
|---|---|---|---|
| 11,372,626 | B2 | 6/2022 | White et al. |
| 11,550,567 | B2 | 1/2023 | Copty et al. |

(Continued)

OTHER PUBLICATIONS

Anonymous, "Fully Decentralized Cloud using Generalized Trusted Execution Environments and Distributed Hash Tables (Without Blockchain)," Feb. 5, 2021, 7 pages, ip.com, accessed on Nov. 30, 2023, https://ip.com/IPCOM/000264923.

(Continued)

*Primary Examiner* — Kendall Dolly
(74) *Attorney, Agent, or Firm* — Yee & Associates, P.C.

(57)　　　　ABSTRACT

Managing access to computing environments is provided. A number of infrastructure as code (IAC) configurations are configured, wherein the IAC configurations are related to a same project. The IAC configurations are grouped into a number of environments, wherein the environments represent project stages or deployment situations, and wherein the environments have respective access privileges and allowed modifications for the respective IAC configurations within each environment. A number of user trusted profiles are automatically created that are linked to the access privileges and allowed modifications for the environments, wherein each trusted profile is specific to one of the environments. Modification are be deployed in an environment only after those modifications have been successfully deployed in a prerequisite environment.

20 Claims, 7 Drawing Sheets

(56) References Cited

U.S. PATENT DOCUMENTS

| | | | |
|---|---|---|---|
| 2025/0030722 A1* | 1/2025 | Ragula | H04L 63/102 |
| 2025/0047709 A1* | 2/2025 | Arla | H04L 63/20 |

OTHER PUBLICATIONS

Anonymous, "Infrastructure as Code for automated self service AWS environments," 21 pages, AWS Marketplace, DevOps Institute, accessed on Nov. 20, 2023, https://pages.awscloud.com/rs/112-TZM-766/images/Infrastructure-as-code-for-automated-self-service-aws-environments.pdf.

Anonymous, "Method and system for protection of sensitive data in infrastructure management services," Jul. 28, 2015, 11 pages, ip.com, accessed on Nov. 30, 2023, https://ip.com/IPCOM/000242582.

Dahir et al, "Dynamic Trust and Risk Scoring Using Last-Known-Profile Learning," Cisco Systems, Inc., Aug. 31, 2016, 13 pages, ip.com, accessed on Dec. 1, 2023, https://www.researchgate.net/publication/374754529_DYNAMIC_TRUST_AND_RISK_SCORING_USING_LAST-KNOWN-_PROFILE_LEARNING.

Joseph et al., "Infrastructure As Code," 2021, 11 pages, Dell Inc., accessed on Nov. 22, 2023, https://education.dell.com/content/dam/dell-emc/documents/en-us/2021KS_Joseph-Infrastructure_as_Code.pdf.

Klein et al., "Infrastructure as Code-Final Report," Dec. 2018, 19 pages, Carnegie Mellon University Software Engineering Institute, Pittsburgh, accessed on Nov. 22, 2023, https://insights.sei.cmu.edu/library/infrastructure-as-code-final-report/.

Prisma Cloud, "The DevSecGuide to Infrastructure as Code," Bridgecrew by Prisma Cloud, 2021, 12 pages, Palo Alto Networks, accessed on Nov. 20, 2023, https://bridgecrew.io/wp-content/uploads/devsecguide-iac-security.pdf.

* cited by examiner

COMPUTING ENVIRONMENT
100

200

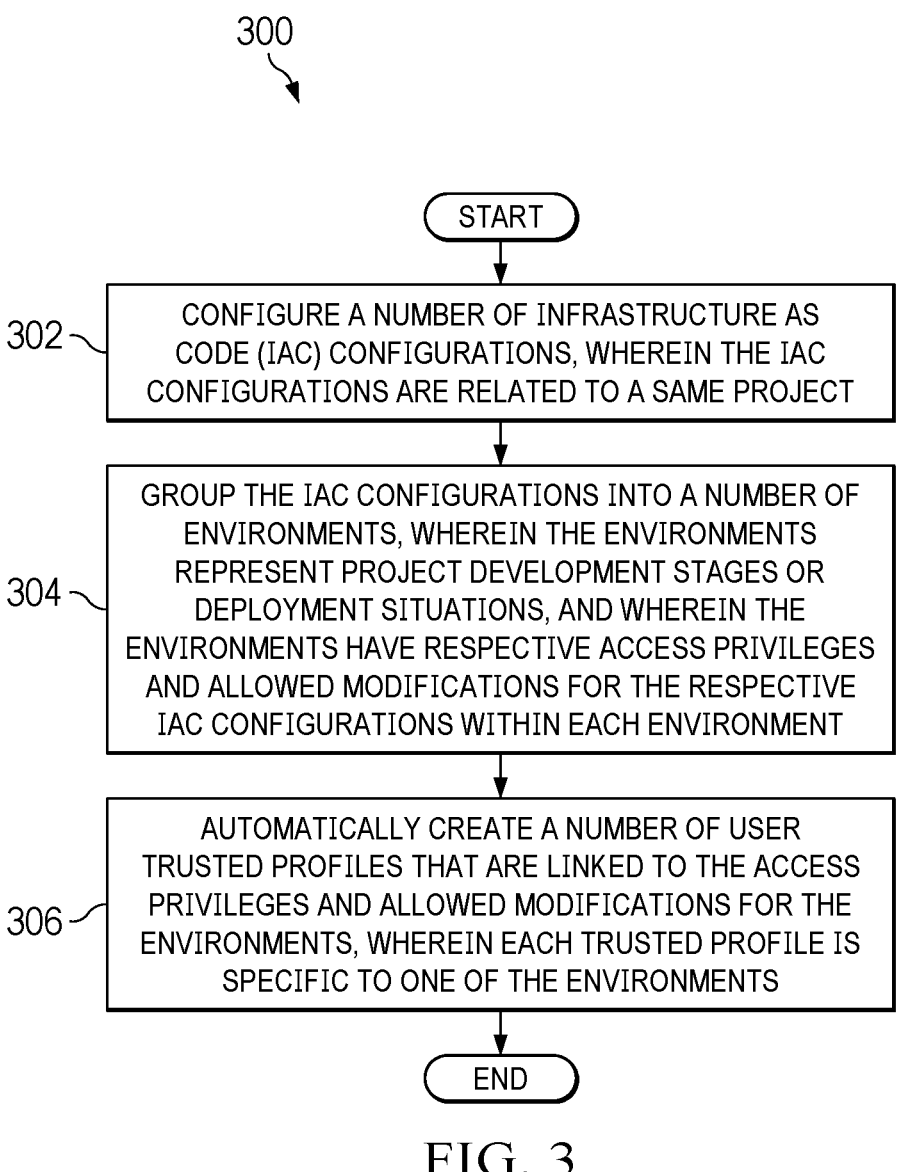

300

START

302 — CONFIGURE A NUMBER OF INFRASTRUCTURE AS CODE (IAC) CONFIGURATIONS, WHEREIN THE IAC CONFIGURATIONS ARE RELATED TO A SAME PROJECT

304 — GROUP THE IAC CONFIGURATIONS INTO A NUMBER OF ENVIRONMENTS, WHEREIN THE ENVIRONMENTS REPRESENT PROJECT DEVELOPMENT STAGES OR DEPLOYMENT SITUATIONS, AND WHEREIN THE ENVIRONMENTS HAVE RESPECTIVE ACCESS PRIVILEGES AND ALLOWED MODIFICATIONS FOR THE RESPECTIVE IAC CONFIGURATIONS WITHIN EACH ENVIRONMENT

306 — AUTOMATICALLY CREATE A NUMBER OF USER TRUSTED PROFILES THAT ARE LINKED TO THE ACCESS PRIVILEGES AND ALLOWED MODIFICATIONS FOR THE ENVIRONMENTS, WHEREIN EACH TRUSTED PROFILE IS SPECIFIC TO ONE OF THE ENVIRONMENTS

END

START

402 — ENVIRONMENT MARKED AS SENSITIVE – TRUSTED PROFILE REQUIRED

404 — DOES TRUSTED PROFILE EXIST?

YES

NO

406 — QUERY REQUIRED TRUSTED PROFILE PROPERTIES

408 — AUTO-CREATE TRUSTED PROFILE

410 — PROMPT USER TO ASSUME TRUSTED PROFILE

END

METHOD FOR SENSITIVE INFRASTRUCTURE PROTECTION

BACKGROUND

The disclosure relates generally to testing infrastructure as code and more specifically to controlling access to infrastructure as code configurations in sensitive environments.

Infrastructure as Code (IAC) is a paradigm that transforms the management and deployment of computing infrastructure by treating it as code. This approach allows developers to define, configure, and manage infrastructure components using machine-readable scripts. IAC provides a method to describe a desired state of the infrastructure therefore making it a valuable element in development practices. Implementing IAC involves use of specialized tools and frameworks that enable users to express infrastructure configurations in code. In this case, the tools serve as orchestrators to interpret code and automate the deployment and maintenance of infrastructure resources.

The implementation of IAC streamlines infrastructure management to promote collaboration between development and operations, thereby accelerating the delivery of reliable infrastructure. The use of IAC tools enables organizations to eliminate manual and error prone processes. In this case, the development and operation costs may be reduced by leveraging IAC to create repeatable secure and compliant infrastructure solutions that can be used for many applications.

SUMMARY

According to an illustrative embodiment, a computer-implemented method for managing access to computing environments is provided. A number of infrastructure as code (IAC) configurations are configured, wherein the IAC configurations are related to a same project. The IAC configurations are grouped into a number of environments, wherein the environments represent project stages or deployment situations, and wherein the environments have respective access privileges and allowed modifications for the respective IAC configurations within each environment. A number of user trusted profiles are automatically created that are linked to the access privileges and allowed modifications for the environments, wherein each trusted profile is specific to one of the environments. According to other illustrative embodiments, a computer system and a computer program product for managing access to computing environments are provided.

BRIEF DESCRIPTION OF THE DRAWINGS

FIG. 3 depicts a flowchart illustrating a process for managing access to computing environments is shown in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
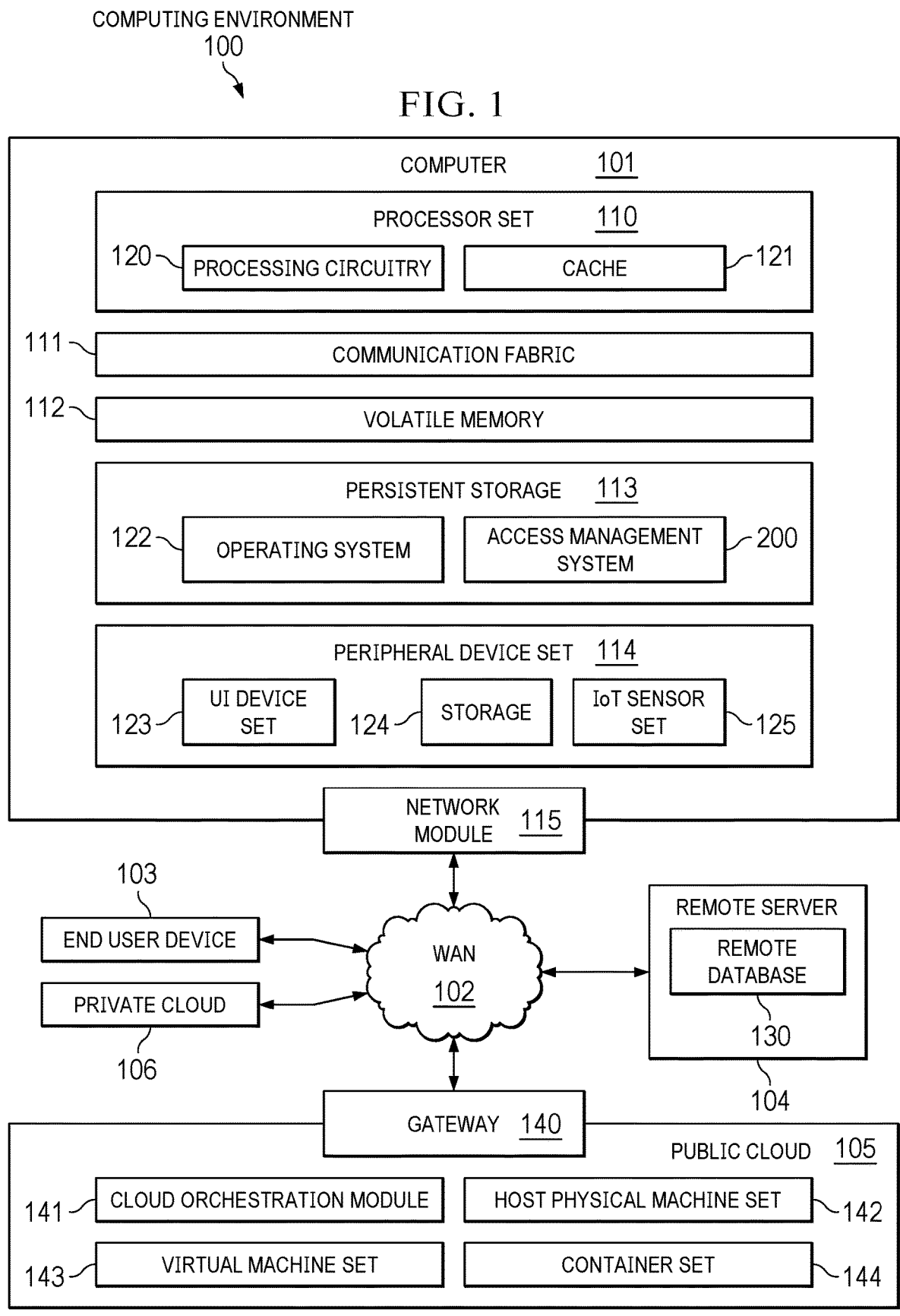
FIG. 1 is a block diagram of a computing environment in accordance with an illustrative embodiment.
Figure 2:
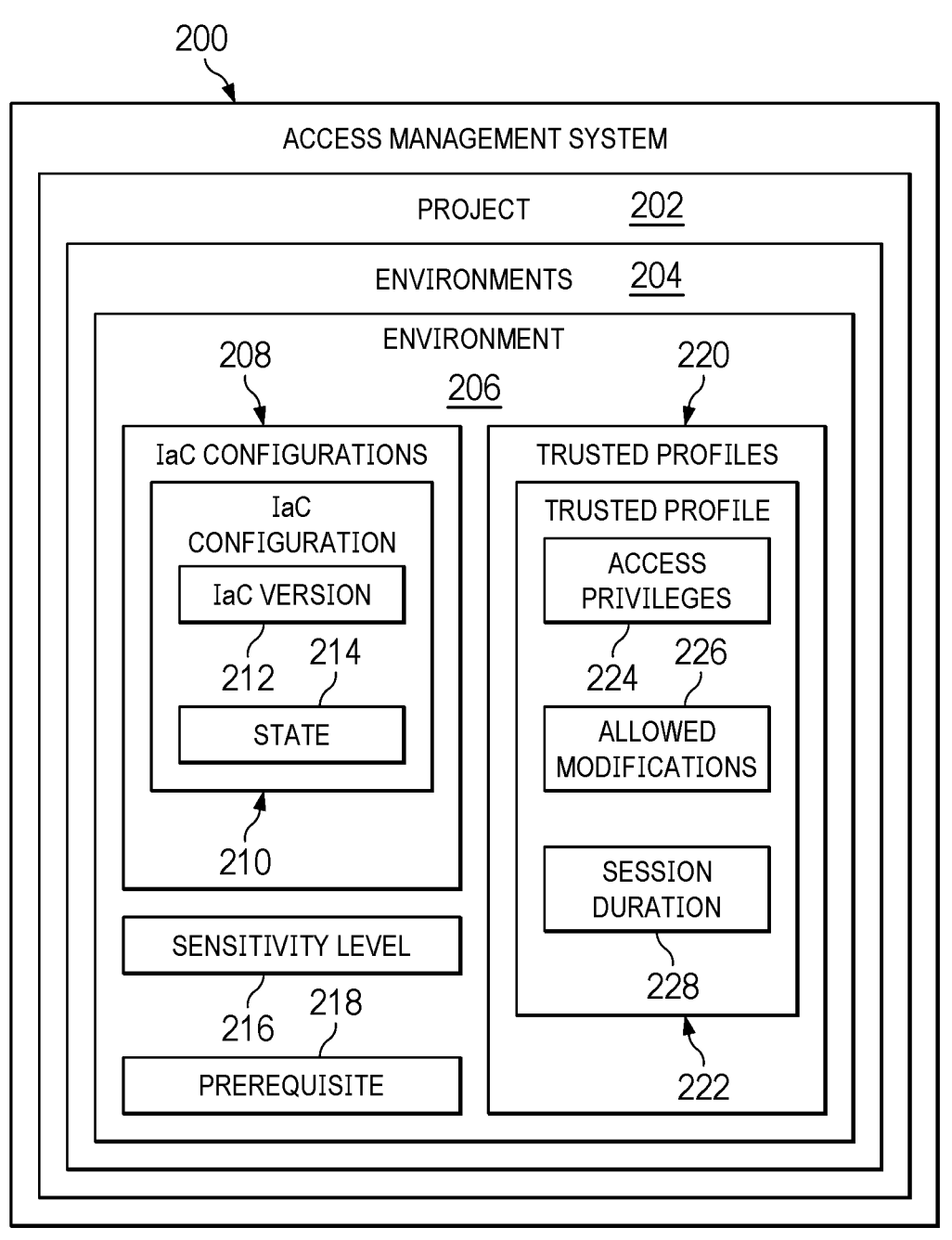
FIG. 2 is a block diagram of an access management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as access management system 200. In this example, access management system 200 can operate to manage access for computing environments.

In addition to access management system 200, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and access management system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in access management system 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in access management system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that in the world of cloud infrastructure, certain infrastructure is more important than others. For example, infrastructure used during application development and testing, while important, is less important than infrastructure hosting live applications. Infrastructure hosting encryption keys for sensitive data is more important still.

The illustrative embodiments recognize and take into account that traditional cloud management the only mechanisms available to control more or less sensitive infrastructure is related to Identify and Access management system (IAM) policy, which controls who can access the infrastructure. This IAM policy solution is inadequate since even trusted individuals can make mistakes when deploying IAC with significant consequences.

The illustrative embodiments also recognize and take into account that the chance of making such error is significant because all development and production infrastructure look similar in all cloud interfaces because they are only typically identified only by names or tags.

The illustrative embodiments provide a method to manage infrastructure as code that introduces an overlay grouping mechanism (environments) comprising additional metadata to categorize infrastructure into different levels of sensitivity. Authorized access is granted to specific environments for specific durations of time to limit what modifications authorized users can make. For example, IAC with low levels of sensitivity can be deployed and tested by authorized users with little overhead. In contrast, IAC with high levels of sensitivity must go through an approval flow, be tested in a lower sensitivity environment, and authorized users must adopt a trusted profile specific to the environment to deploy changes. Intermediate levels of sensitivity can employ a subset of these controls.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

With reference now to FIG. 2, a block diagram of an access management system is depicted in accordance with an illustrative embodiment. In this illustrative example, access management system 200 includes components that can be implemented in hardware such as the hardware shown in computing environment 100 in FIG. 1.

Access management system 200 can be applied to a particular project 202. Implementing project 202 might involve a number of environments 204 which represent different stages or deployment situations. For example, the respective environments 204 might represent development, testing, and productions stages or deployment situations for different customers.

Each environment 206 among environments 204 comprises a number of IAC configurations 208 related to different functions. Each IAC configuration 210 among IAC configurations 208 has a specific version 212 of code that it implements. Each IAC configuration 210 also has a given state 214 that reflects its readiness within that environment 206 such, e.g., draft state versus successfully deployed.

Each environment 206 has an associated sensitivity level 216, which reflects the level of care and caution that must be exercised when making modifications to that environment. Environments 204 have metadata that includes an optional prerequisite environment and level of protection required (to adapt to the sensitivity of the infrastructure). When a deployment of a configuration is attempted, the environment prerequisite 218 is used to locate a group of candidate configs to search for a successful deployment of the matching IAC and version (see FIG. 5). This search enables policy checks to ensure that new IAC versions are tested in lower sensitivity environments first. For example, IAC "A" should be tested in the "development" environment before being deployed in a "production" environment. An administrator can define a policy for each environment 206 which is enforced by the IAC cloud service.

A number of trusted profiles 220 allows users to operate and an elevated level of privilege that is specific to that environment. Each trusted profile 222 is linked with specific access privileges for the environment 206 in question as well as allowed modifications 226 that the user can make to IAC configurations 208 with the environment 206. The allowed modifications 226 specifically prescribe what a user can perform in the environment 206 while logged in under the trusted profile 222. The trusted profiles 220 grant users privileges to perform actions through the cloud service (actions could include things like edit configurations, approve configurations, deploy configurations) based on the environments or environment sensitivities (i.e., the environment 206 and sensitivity level 216 are exposed as attributes to the IAM system). It should be noted that with trusted profiles 220 the user is not directly authorized to deploy to a sensitive environment 206, rather a trusted profile 222 that the user can assume is granted that access. Each trusted profile 222 also has a specified session duration 228 that limits how long the user can remain logged in under the trusted profile. This limited duration prevents the user from remaining logged in under the trusted profile indefinitely, thereby reducing the chances of the user inadvertently making unwanted modifications.

Trusted profiles 220 for granting access to sensitive environments are auto-created and configured to be specific to one environment and not allow access to other environments and to have short session durations 228. These restrictions ensures that users do not accidentally or on purpose use the trusted profile 222 for all work, but rather only when privilege escalation is required. In other words, trusted profiles 220 provide users with limited and specific mission statements. Also, a check is made to warn if users have direct access to the sensitive environment 206 outside of the trusted profile 222.

FIG. 3 depicts a flowchart illustrating a process for managing access to computing environments is shown in accordance with an illustrative embodiment. Process 300 may be implemented in a computer, such as, for example, computer 101 in FIG. 1 and access management system 200 in FIG. 2.

Process 300 begins by configuring a number of infrastructure as code (IAC) configurations, wherein the IAC configurations are related to a same project (step 302).

The IAC configurations are grouped into a number of environments (step 304). These environments represent project development stages or deployment situations. The environments have respective access privileges and allowed modifications for the respective IAC configurations within each environment. The project development stages might comprise at least one of development, testing, or production.

A modification cannot be deployed in an environment unless that modification has been successfully deployed in a prerequisite environment. Similarly, an IAC configuration version cannot be deployed in an environment unless that IAC configuration version has been successfully deployed in a prerequisite environment. Such prerequisite deployment can be confirmed by searching all IAC configurations in a prerequisite environment for a match of a target IAC configuration version with a successful deployment. (See FIG. 5).

Process 300 then automatically creates a number of user trusted profiles that are linked to the access privileges and allowed modifications for the environments, wherein each trusted profile is specific to one of the environments (step 306). The access privileges may specify session time duration limits. The access privileges may also limit access to the specific environment to which access privileges and allowed modifications are linked. Process 300 then ends.

Figure 4:
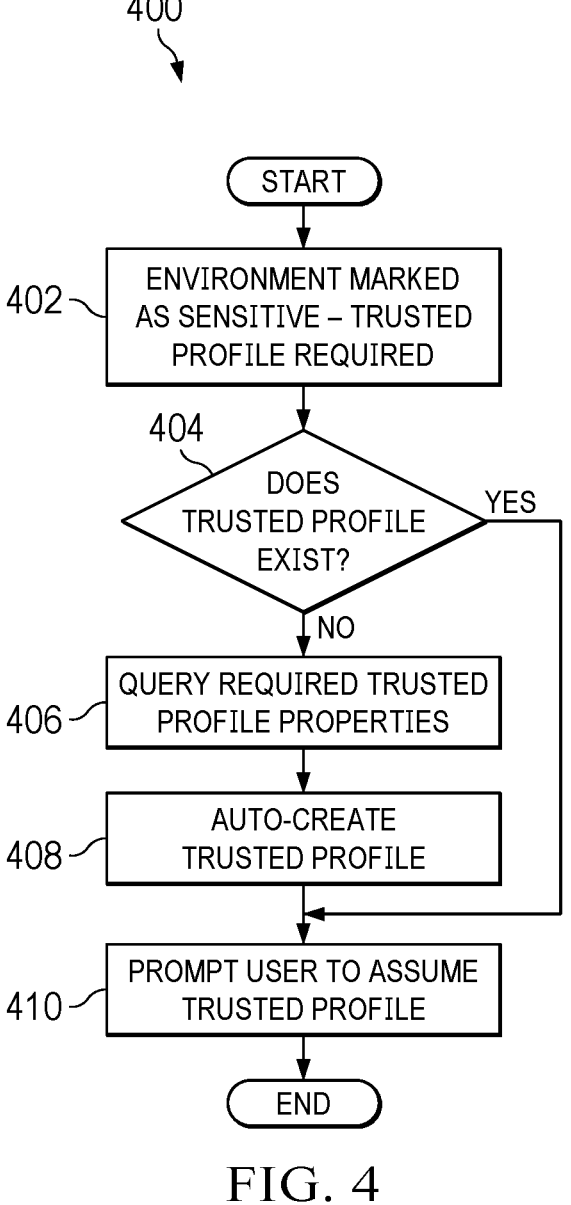
FIG. 4 depicts a flowchart illustrating the process of auto-creation of a trusted profile for an environment in accordance with an illustrative embodiment.

FIG. 4 depicts a flowchart illustrating the process of auto-creation of a trusted profile for an environment in accordance with an illustrative embodiment. Process 400 is a detailed example of step 306 in FIG. 3.

Process 400 begins with an environment being marked as sensitive and in need of a trusted profile (step 402). Process 400 then determines whether a trusted profile exists (step 404). Trusted profiles might be stored within the IAM system of the cloud. If a trusted profile does already exist, process 400 prompts the user to assume the existing trusted profile in order to proceed (i.e., the user does not currently have enough privileges to perform the operation in question) (step 410).

If there is no existing trusted profile, process 400 queries the required trusted profile properties (step 406). These properties might include whether the trusted profile will employ a policy versus an access group (AG). The permissions associated with the trusted profile can be directly assigned to the trusted profile via a policy or indirectly via an AG (which in turn has a policy attached). The trusted profile might be linked to a specific environment or multiple environments at the same sensitivity level. For example, a project might comprise three production environments that represent three different regions of the world. A single trusted profile might provide access to all three production environments since all production environments might typically need to be updated similarly at the same time. However, caution should be taken not to extend the privileges of the trusted profile too broadly, which would increase the likelihood of user errors that the trusted profile is intended to prevent.

Based on the required properties, process 400 auto-creates the trusted profile (step 408). The trusted profile might have a built-in limited session time and is assigned permissions, either directly or via an AG as described above. After the trusted profile is created, process 400 proceeds to step 410 to prompt the user to assume the trusted profile. Process 400 then ends.

Figure 5:
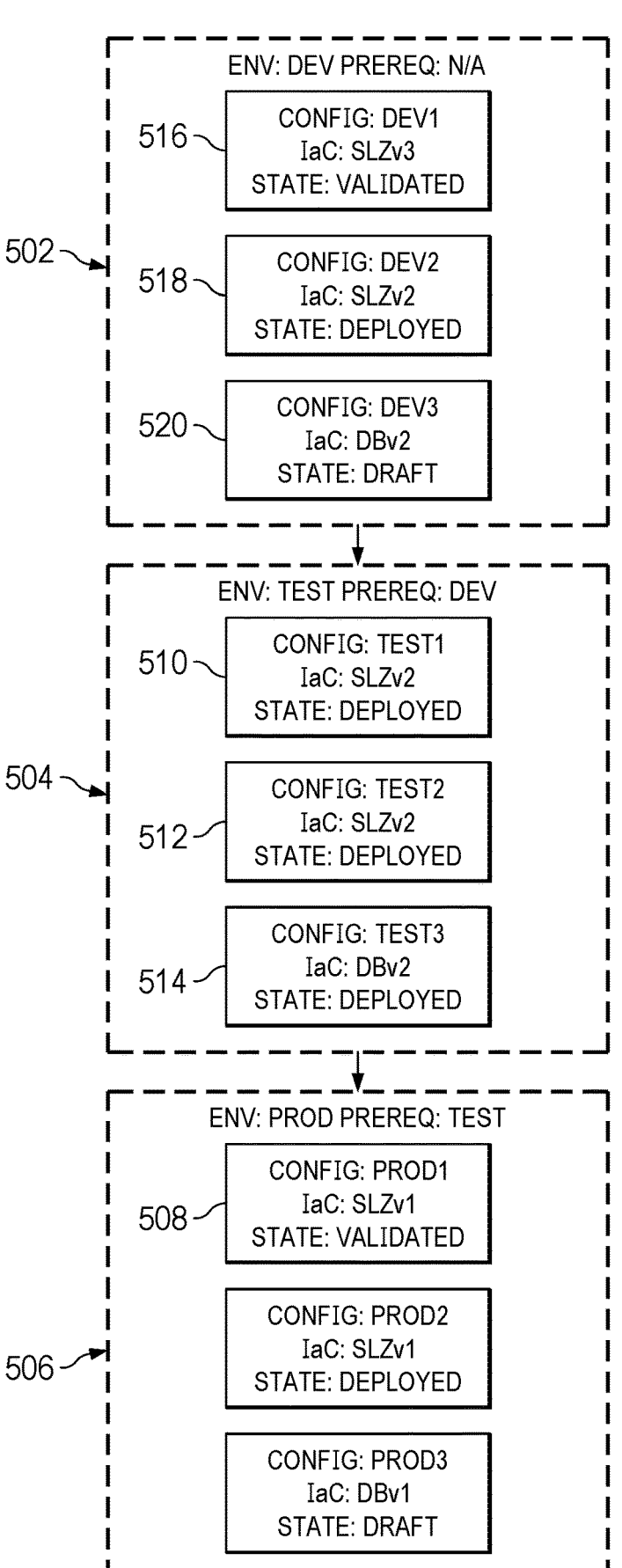
FIG. 5 depicts an example of deployment in prerequisite environments in accordance with an illustrative embodiment.

FIG. 5 depicts an example of deployment in prerequisite environments in accordance with an illustrative embodiment. The example shown in FIG. 5 includes three environments: development environment 502, test environment 504, and production environment 506. Each environment has an associated prerequisite. In the present example, an IAC configuration cannot be deployed in production environment 506 unless it has been successfully deployed in test environment 504. Similarly, an IAC configuration cannot be deployed in test environment 504 unless it has been successfully deployed in development environment 502. However, development environment 502 does not have a prerequisite environment value because it represents the initial environment upon which the others build.

Each environment contains a number of IAC configurations. Each IAC configuration has a respective version and state. The state of an IAC configuration might be, for example, draft, validated, or deployed, reflecting the developmental and operational state of that configuration in the environment in question. Taking into account that the code for IAC configurations is routinely updated (newer versions), the illustrative embodiments require not just that an IAC configuration be successfully deployed in a prerequisite environment but that a specific version of that IAC configuration have been deployed in the prerequisite environment.

For example, IAC configuration Prod1 508 contains IAC version SLZv1. In order to deploy an updated version of that IAC (SLZv2) in the production environment 506, the system searches the configurations in the prerequisite test environment 504 for any configuration successfully deploying the target (desired) IAC version (in the present example SLZv2). All versions of each configuration are search (most recent first) to find a match for the target IAC version. If a match is found, then the prerequisite is satisfied. In the present example, configurations Test1 510, Test2 512, and Test3 514, which reveals that SLZv2 was successfully deployed in configurations Test1 510 and Test2 512. Therefore, SLZv2 can be deployed in configuration Prod1 508 in the production environment 506.

As another example, to deploy IAC SLZv3 in the test environment 504, the system searches configurations Dev1 516, Dev2 518, and Dev3 520 in development environment 502. In this case, SLZv3 has been successfully deployed by configuration Dev1 516. Therefore, the prerequisite is satisfied to deploy SLZv3 in the test environment 504.

Figure 6:
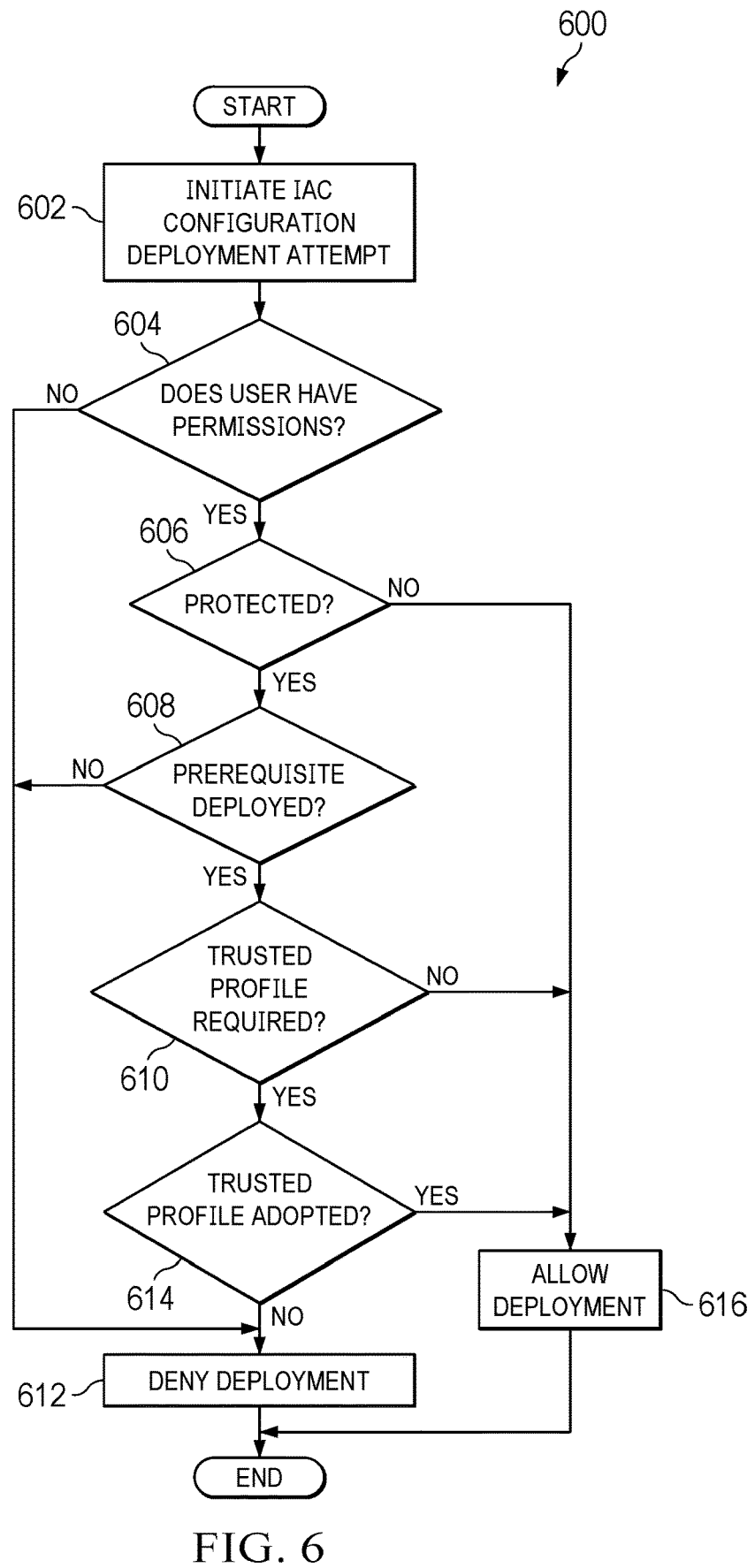
FIG. 6 depicts a flowchart illustrating a process for protecting sensitive infrastructure in accordance with an illustrative embodiment.

FIG. 6 depicts a flowchart illustrating a process for protecting sensitive infrastructure in accordance with an illustrative embodiment. Process 600 ties together and implements the processes described above.

Process 600 begins by initiating an IAC configuration deployment attempt (step 602). Process 600 then determines whether the user has permissions to perform the deployment with the user's current credentials (step 604). If the user does not have permissions for the deployment, process 600 denies the deployment (step 612).

If the user does have permissions, process 600 determines whether the environment is protected (step 606). If the environment is not protected, process 600 allows the deployment (step 616).

If the environment is protected, process 600 determines whether the IAC configuration in question was successfully deployed in the prerequisite environment (e.g., such as shown in FIG. 5) (step 608). If the configuration was not successfully deployed in the prerequisite environment, process 600 denies the deployment (step 612).

If the configuration was successfully deployed in the prerequisite environment, process 600 determines whether a trusted profile is required (e.g., such as establish by process 300) (step 610). If a trusted profile is not required, process 600 allows the deployment (step 612). If a trusted profile is required, process 600 determines whether a trusted profile (such as created in process 400) has been adopted by the user (step 614). If the user has not adopted the trusted profile, process 600 denies the deployment (step 612). If the user has adopted the trusted profile, process 600 allows the deployment 9 step 616). Process 600 then ends.

Figure 7:
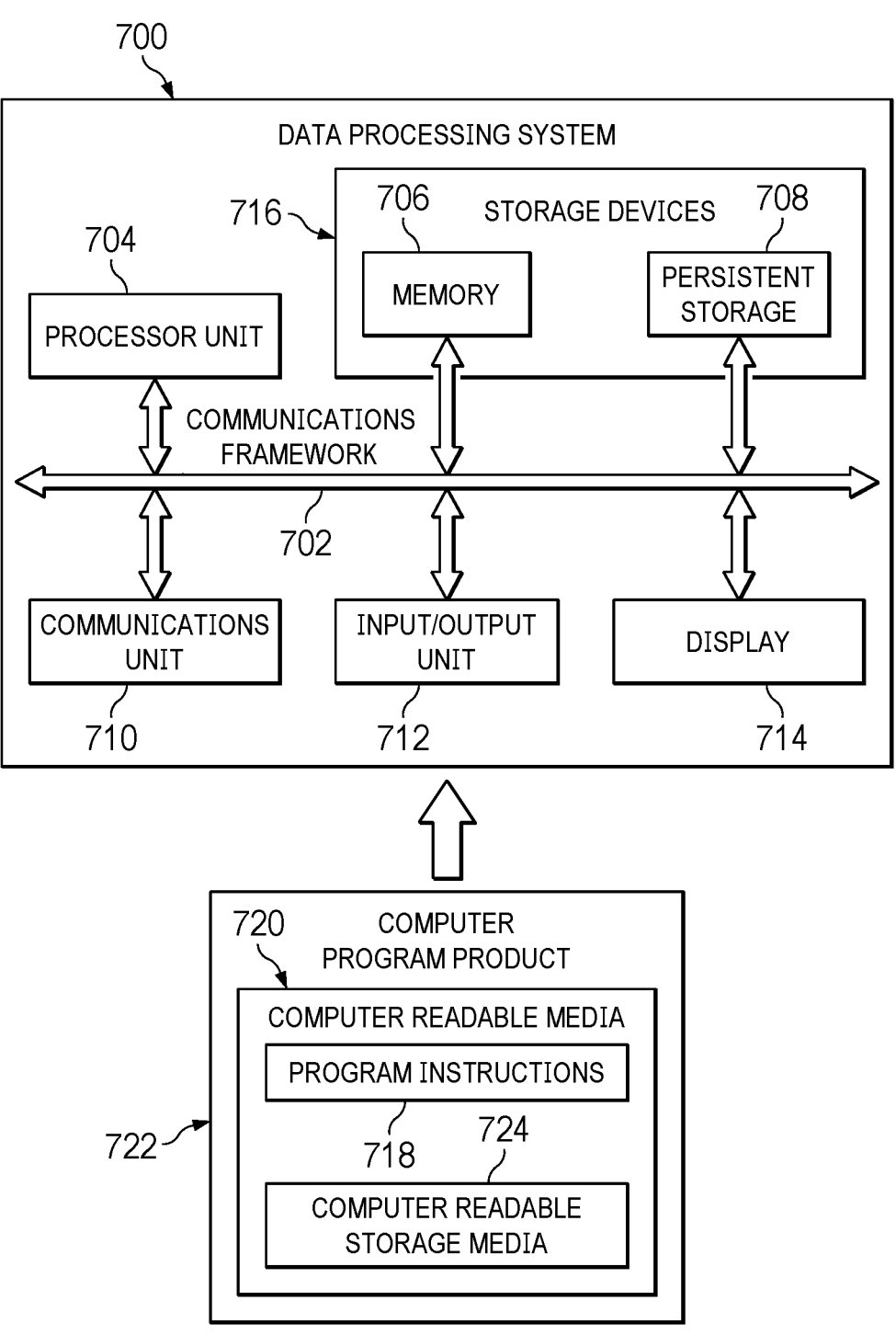
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement computers and computing devices in computing environment 100 in FIG. 1. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can be implemented using one or more heterogeneous processor systems in which a main processor is present with secondary processors on a single chip. As another illustrative example, processor unit 704 can be a symmetric multiprocessor system containing multiple processors of the same type on a single chip.

Memory 706 and persistent storage 708 are examples of storage devices 716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 716 may also be referred to as computer readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program instructions, computer usable program instructions, or computer readable program instructions that can be read and executed by a processor in processor unit 704. The program instructions in the different embodiments can be embodied on different physical or computer readable storage media, such as memory 706 or persistent storage 708.

Program instructions 718 are located in a functional form on computer readable media 720 that is selectively removable and can be loaded onto or transferred to data processing system 700 for execution by processor unit 704. Program instructions 718 and computer readable media 720 form computer program product 722 in these illustrative examples. In the illustrative example, computer readable media 720 is computer readable storage media 724.

Computer readable storage media 724 is a physical or tangible storage device used to store program instructions 718 rather than a medium that propagates or transmits program instructions 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 718 can be transferred to data processing system 700 using a computer readable signal media. The computer readable signal media are signals and can be, for example, a propagated data signal containing program instructions 718. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 720 can be singular or plural. For example, program instructions 718 can be located in computer readable media 720 in the form of a single storage device or system. In another example, program instructions 718 can be located in computer readable media 720 that is distributed in multiple data processing systems. In other words, some instructions in program instructions 718 can be located in one data processing system while other instructions in program instructions 718 can be located in one data processing system. For example, a portion of program instructions 718 can be located in computer readable media 720 in a server computer while another portion of program instructions 718 can be located in computer readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program instructions 718.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of managing access to computing environments, the method comprising:
using a number of processors to perform:
configuring a number of infrastructure as code (IAC) configurations, wherein the IAC configurations are related to a same project;
grouping the IAC configurations into a number of environments, wherein the environments represent project stages or deployment situations, and wherein the environments have respective access privileges and allowed modifications for the respective IAC configurations within each environment, and wherein the IAC configuration has no prerequisite environment, or the IAC configuration has been successfully deployed in a prerequisite environment; and
automatically creating a number of user trusted profiles that are linked to the access privileges and allowed modifications for the environments, wherein each trusted profile is specific to one of the environments.

2. The method of claim 1, wherein a modification cannot be deployed in an environment unless that modification has been successfully deployed in a prerequisite environment.

3. The method of claim 1, further comprising searching all IAC configurations in a prerequisite environment for a match of a target IAC configuration version with a successful deployment.

4. The method of claim 1, wherein the project development stages comprise at least one of:
development;
testing; or
production.

5. The method of claim 1, wherein the access privileges specify session time duration limits.

6. The method of claim 1, wherein the access privileges limit access to the specific environment to which access privileges and allowed modifications are linked.

7. The method of claim 1, wherein a deployment of the IAC configuration to a selected environment is denied unless a user has assumed a trusted profile corresponding to the selected environment prior to the deployment.

8. A system for managing access to computing environments, the system comprising:
a storage device that stores program instructions;
one or more processors operably connected to the storage device and configured to execute the program instructions to cause the system to:
configure a number of infrastructure as code (IAC) configurations, wherein the IAC configurations are related to a same project;
group the IAC configurations into a number of environments, wherein the environments represent project stages or deployment situations, and wherein the environments have respective access privileges and allowed modifications for the respective IAC configurations within each environment, and wherein the IAC configuration has no prerequisite environment, or the IAC configuration has been successfully deployed in a prerequisite environment; and
automatically create a number of user trusted profiles that are linked to the access privileges and allowed modifications for the environments, wherein each trusted profile is specific to one of the environments.

9. The system of claim 8, wherein a modification cannot be deployed in an environment unless that modification has been successfully deployed in a prerequisite environment.

10. The system of claim 8, wherein the program instructions further cause the system to search all IAC configurations in a prerequisite environment for a match of a target IAC configuration version with a successful deployment.

11. The system of claim 8, wherein the project development stages comprise at least one of:
development;
testing; or
production.

12. The system of claim 8, wherein the access privileges specify session time duration limits.

13. The system of claim 8, wherein the access privileges limit access to the specific environment to which access privileges and allowed modifications are linked.

14. The system of claim 8, wherein a deployment of the IAC configuration to a selected environment is denied unless a user has assumed a trusted profile corresponding to the selected environment prior to the deployment.

15. A computer program product for managing access to computing environments, the computer program product comprising:

a computer readable storage medium having program instructions configured to cause one or more processors to:

configure a number of infrastructure as code (IAC) configurations, wherein the IAC configurations are related to a same project;

group the IAC configurations into a number of environments, wherein the environments represent project stages or deployment situations, and wherein the environments have respective access privileges and allowed modifications for the respective IAC configurations within each environment, and wherein the IAC configuration has no prerequisite environment, or the IAC configuration has been successfully deployed in a prerequisite environment; and automatically create a number of user trusted profiles that are linked to the access privileges and allowed modifications for the environments, wherein each trusted profile is specific to one of the environments.

16. The computer program product of claim 15, wherein a modification cannot be deployed in an environment unless that modification has been successfully deployed in a prerequisite environment.

17. The computer program product of claim 15, further comprising instructions for searching all IAC configurations in a prerequisite environment for a match of a target IAC configuration version with a successful deployment.

18. The computer program product of claim 15, wherein the access privileges specify session time duration limits.

19. The computer program product of claim 15, wherein the access privileges limit access to the specific environment to which access privileges and allowed modifications are linked.

20. The computer program product of claim 15, wherein a deployment of the IAC configuration to a selected environment is denied unless a user has assumed a trusted profile corresponding to the selected environment prior to the deployment.

* * * * *